United States Patent Office                3,509,473
                                         Patented Apr. 28, 1970

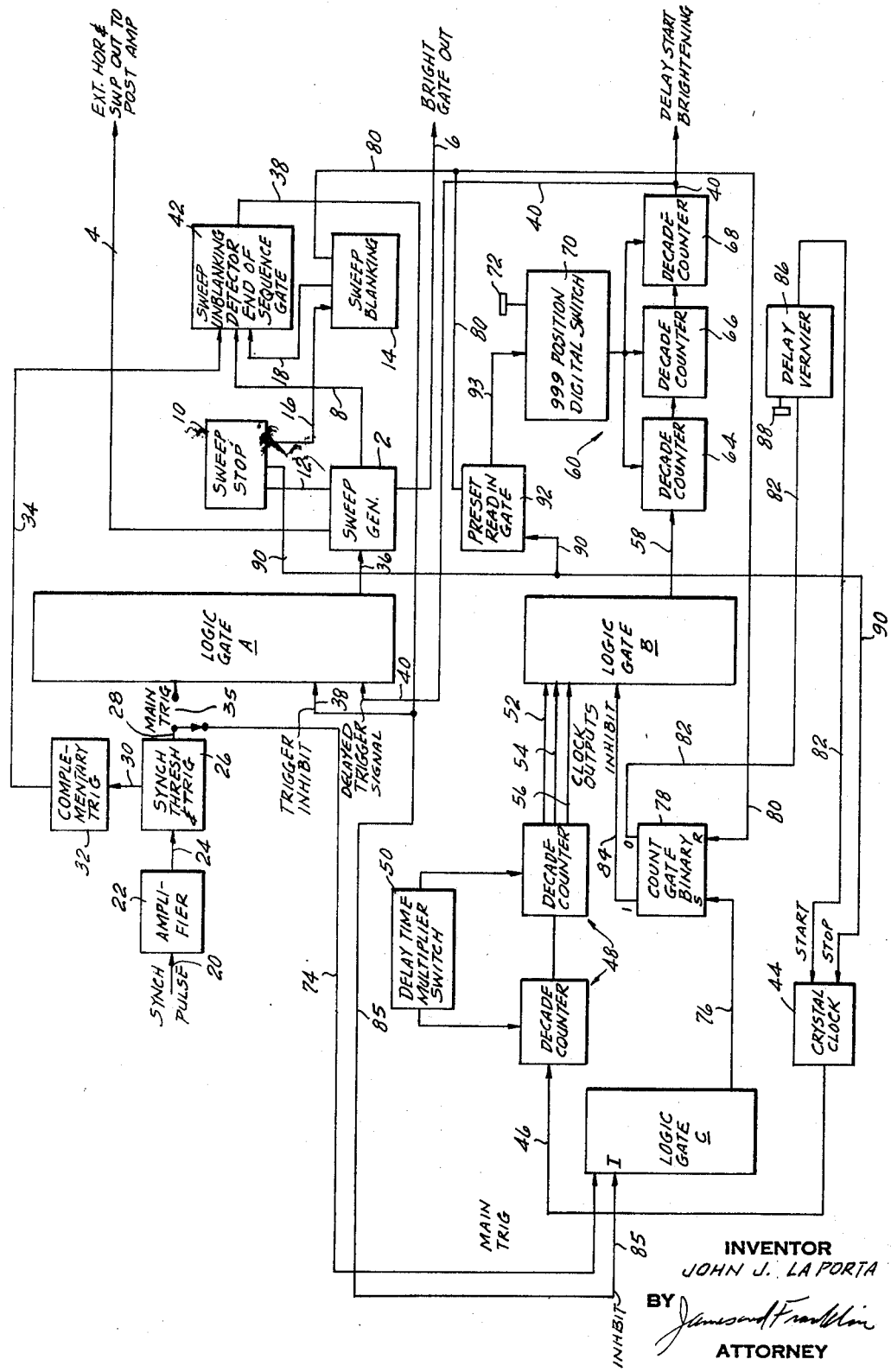

3,509,473
TIME MEASURING SYSTEM
John J. La Porta, Allendale, N.J., assignor, by mesne assignments, to Spedcor Electronics, Inc.
Filed Aug. 2, 1965, Ser. No. 476,594
Int. Cl. H03k 17/26, 17/28, 17/00
U.S. Cl. 328—72                                13 Claims

ABSTRACT OF THE DISCLOSURE

A system for measuring a time interval between a starting signal and an output signal, the output signal initiating a work operation which occurs cyclically, in which the timing is accomplished by an oscillator clock which is started by the starting signal and which is stopped after the output signal has been produced and while the work operation is taking place, the clock again being started after the work operation has finished a given cycle and the next starting signal is received, thereby to eliminate the possibility of time measurement error arising from the reception of a starting signal during the discrete period of time that a given timing pulse exists from the oscillator clock.

---

The present invention relates to a system for the measurement of time intervals, and which particularly features the very accurate reproducibility of the measured time interval. The invention also relates to the use of such a system for controlling the operation of a work device such as the sweep system of an oscilloscope, so that the moment of initiation of operation of the work device (moment of beginning of the sweep sequence) can be precisely controlled.

While the system of the present invention is particularly well adapted for use in controlling the initiation of the sweep sequence of an oscilloscope, and it is here specifically illustrated in that connection, it may be used for controlling the operation of other work devices, or may be used in and of itself for time measurement purposes.

This broad applicability of the teachings of the present invention must be kept in mind in considering this specification, which is drafted in terms of its specific applicability to oscilloscope use.

In oscilloscopes or comparable electronic indicating devices a beam is periodically swept across a screen from one side to the other in accordance with a given parameter, usually time, and is subjected to a vertical deflection as it thus sweeps, that vertical deflection being in accordance with a different parameter such as the voltage of a phenomenon under investigation. When that phenomenon is of a periodically recurring type and the sweep is synchronized with the period of recurrence of that phenomenon, the picture which appears on the screen becomes a steady one, reinforced by each succeeding sweep, and constitutes a representation of the relationship between the sweep parameter and deflection parameter, e.g., constitutes a "graph" of the voltage of the phenomenon measured against time.

This synchronization is achieved by producing a series of recurring signal pulses, called "synch pulses" because they are employed for synchronization purposes and which are some integral multiple of the frequency of the phenomenon. When this is done each sweep will start at an instant when the phenomenon under investigation is at the same position in its cycle. Once a sweep has been started the synch pulses may continue but are rendered ineffective until the sweep has finished and the sweeping system has reset itself, ready for another sweep. The "sweep sequence" may be considered to constitute the actual sweep which produces an indication on the screen, followed by the short period of time which is required for the beam to restore itself to its initial position and the time interval waiting for the next synch pulse.

It often occurs that only a preselected portion of the phenomenon under investigation is to be examined, the horizontal time base of the oscilloscope being expanded so that only the desired portion of the phenomenon is displayed on the screen. This may require that the actual start of the sweep be delayed, following receipt of the operative synch pulse, by a period of time such as to cause the sweep to commence at precisely the right moment. The time delay between the receipt of the synch pulse and the starting of the sweep must not only be accurately attainable, but also must be very accurately reproducible from one cycle of operation of the oscilloscope to the next. Any error in the measurement or determination of this time delay period would result in the starting of the sweep at specifically different points in the phenomenon cycle, and thus will produce on the screen of the oscilloscope aberrations caused by lack of synchronization between sweep and phenomenon cycle, such as a picture which is blurred or which jiggles or jumps.

In the past it has been proposed to utilize an accurate clock means which emits recurrent signals at a very high frequency and at a very constant frequency, and to measure periods of time by counting these recurrent signals. The accuracy of such a system is limited, however, particularly insofar as interval measurement is concerned, by the frequency of the signals produced by the clock means. With the clock means running continuously, as is conventionally the case, and with counting initiated upon receipt of a sych pulse, the precise moment in the clock output cycle when the synch pulse is received will cause a variation in the actual time interval corresponding to the counting of a predetermined number of clock output signals. If the synch pulse is received at the very beginning of a clock output signal cycle, or at the very end of that cycle, or at any point inbetween in that cycle, the counting will be commenced at that moment, and a haphabard error in time measurement having a maximum value equal to the time of a single cycle of the clock output signal will result. Since the frequency of the synch pulses usually is unrelated to, and usually is considerably less than, the frequency of the clock output signal, this type of error is inherent in conventional systems. It will result, when such systems are used in oscilloscopes, in a horizontal shifting of the picture displayed on the screen by a distance corresponding to whatever time error may obtain for each sweep sequence, and this will produce, as indicated above, unsteadiness or a lack of clarity in the trace displayed on the screen. When such a system is employed in environments other than oscilloscopes, the same type of haphazard error will obtain, although it will manifest itself in different fashions.

It is the prime object of the present invention to devise a time measurement system which will measure recurrent preselected time intervals with an exceptionally high degree of reproducibility or uniformity, and in particular will make that reproducibility or uniformity more accurate than the time involved in a single cycle of the clock output signal. When such a system is employed in conjunction with an oscilloscope, the object of the present invention is to devise a time delay for controlling the initiation of the sweep sequence which will be far more accurate than any which have previously been known. The system of the present invention, considered solely as a time measuring system, will provide a very high degree of accuracy insofar as reproducibility is concerned and, through appropriate calibration, a very high degree of accuracy insofar as actual time measurement is involved.

In accordance with the present invention a clock means is utilized which produces a high frequency recurrent signal, as has been done in the past. However, in contradistinction to what has been done in the past, in the system of the present invention the clock means does not operate continuously. It is normally non-operative, and it is started in operation only upon receipt of an appropriate starting signal, such as an operative synch pulse in an oscilloscope system. After a predetermined time interval has been measured by the counting of a predetermined number of clock output signals, the clock is turned off. The clock then awaits restarting by the next operative starting signal. Since the clock starts only upon receipt of an operative starting signal, and since this occurs for each time measurement sequence of the system, the reproducibility or accuracy of the time measurement is greatly enhanced, since the problem of precisely when, in the course of the clock output signal cycle, the starting signal is received is no longer a factor in the operation of the system for measuring time. Each counting cycle will be of precisely the same length, subject only to such variations in the speed of starting of the clock means as may occur, and those variations have been found to be comparatively minor. For example, if the clock means employed is a crystal designed to oscillate at a frequency of one megacycle per second, the maximum accuracy of reproducibility obtainable with conventional counting systems of the type above described would be 1 microsecond. In some instances the entire time duration of that portion of the phenomenon under investigation which is to be viewed on the oscilloscope may itself equal one microsecond. With the conventional system described there would be no reliable control of the point within that microsecond duration of the phenomenon when the oscilloscope sweep would start.

When the time measuring system of the present invention is used in conjunction with a work device in order to start the latter, the time measuring system and the work device are interlocked or interconnected so that the work device is put into operation after the time measuring system has received a starting signal and then measured a predetermined period of time thereafter. The time measuring system is reset after the work device starts to operate, that resetting including stopping of the clock means. In addition, means are provided for preventing the clock means from starting again during the time that the work device is in operation. When the work device ceases operation the time measuring system is conditioned to be actuated upon receipt of the next starting signal to again measure that predetermined time interval and again start the work device after that time interval has been measured. In addition to controlling the on or off condition of the clock means, gates are preferably provided in the system to ensure that the proper sequence of operations takes place.

It takes a finite but exceedingly short period of time for the clock means to come up to speed when it is started. As has been indicated, this period of time will be virtually uniform for a given clock means from one time measurement cycle to another, so that a high degree of reproducible accuracy is obtained. However, this will give rise to a slight error in an absolute time measurement based only upon the steady state frequency of the clock output signals. In order to compensate for this, and to provide accurate control of the precise instant following the receipt of the operative starting signal when the clock signal counting has been completed, a delay vernier may be interposed between the means for receiving the starting signal and the clock means. The number of signals which the counting means is to count before producing its output signal and starting the sweep or other work device may then be set to correspond to a predetermined time delay based on the nominal or steady state frequency of operation of the clock means, and the vernier may be manually adjusted to compensate for that error which is inherent in the coming up to speed of the clock means. The vernier can also be employed to produce minor variations in the overall time interval between starting signal and starting of the work device, thereby, for example, permitting the oscillscope to display on its screen different portions of the phenomenon under investigation through adjustment of the vernier. Thus the vernier can be used for calibration, but another and very important feature is that it provides for the setting of any time delay and thus, together with the clock, provides for complete control of the time domain.

The high degree of time measurement accuracy, and particularly of accuracy in reproducibility of successively measured time intervals, is achieved, it will be noted, through the use of essentially conventional circuit components which are readily available on the market and which have a high degree of reliability, and this accuracy is achieved by circuitry which is relatively simple, very straightforward, and comparatively inexpensive.

To the accomplishment of the above, and to such other objects as may hereinafter appear, the present invention relates to a time measuring system, both in and of itself and as used in conjunction with a work device, and particularly with a cathode ray oscilloscope, all as defined in the appended claims and as described in this specification, taken together with the accompanying drawing, which is a block diagram of the time measuring system which may be used in conjunction with a cathode ray oscilloscope.

The specific sweep control of the oscilloscope system with which the time measurement system of the present invention is here specifically disclosed is that which is described and claimed in my recently filed patent application Ser. No. 433,083 filed Feb. 16, 1965, entitled "Sweep Control System for an Oscilloscope or the Like," which is assigned to the assignee of this application. In that system means, there defined as a complementary trigger, are utilized to eliminate possible errors in the time of starting of the sweep which result from the finite duration of the synch pulse itself. It should be understood that the use of such a complementary trigger is not essential insofar as the novel and inventive aspects of the present invention are concerned.

It will be further understood that the specific circuitry used to carry out the operational requirements of the system of the present invention may be widely varied, and that various types of circuit arrangements and circuit components are known to be useable to produce particular, more or less standard, results. The invention here does not lie in such specific circuitry or components, but instead resides in the organization of known circuits, components or subassemblies in a novel fashion in order to achieve the desired objectives. Accordingly, as is conventional under such circumstances, the invention is there disclosed in block diagram form. It will be further understood that the details of the oscilloscope itself and of the means for producing and controlling the sweep beam and producing an image on a screen or the like may take any desired form, and also constitute no specific part of the present invention.

Referring now to the block diagram, the upper portion of that diagram discloses the sweep system which is designed, when actuated, to produce a sweep sequence in a cathode ray oscilloscope, that sequence including the formation of a sweeping beam and the sweeping of that beam from one side to the other of a screen or the like. The sweep generator 2, when appropriately actuated, produces output signals 4 and 6 which give rise to said beam formation and beam sweeping. In order to prevent the start of a second sweep until after the first sweep has terminated, the sweep generator 2 produces an inhibiting voltage the transmission of which is schematically indicated by the line 8. After a predetermined period of time required for the sweep, a sweep stop system 10 actuates the sweep generator, as indicated by line 12, so as to cause the sweeping beam to disappear, and actuates a sweep blanking system 14, as indicated by the line 16, so as to cause the sweep to reset, the sweep blanking system 14, during the resetting period, putting forth an inhibiting voltage the transmission of which is represented by the line 18. In conventional systems when both of the inhibitnig voltages 8 and 18 have disappeared (or, to put the matter another way, when neither of the inhibiting voltages 8 and 18 exist) an end-of-sequence signal is considered to exist which, in conjunction with a synch pulse (or a trigger signal produced by the synch pulse) is utilized to start the next sweep. (The absence of the voltage 8 can be considered as an end-of-sweep signal and the absence of the voltage 18 can be considered an end-of-sweep-reset signal, the end-of-sequence signal thus existing when both the end-of-sweep signal and the end-of-sweep-reset signal exist.)

The synch pulse or starting signal, represented by the line 20, which may if desired be amplified at 22, is fed at 24 to circuitry represented by the block 26 entitled "Synch Threshold and Trigger." This circuitry 26 will, when the magnitude of the synch pulse exceeds a predetermined value, produce a main trigger signal 28. The system 26 has an additional output 30 which actuates circuitry 32 for producing a complementary trigger signal the transmission of which is indicated by the line 34. The complementary trigger signal is produced only in those intervals of time between the main trigger signals 28. Both of the trigger signals 28 and 30 are preferably of small time duration compared to the cyclic frequency of the phenomenon, and it is usually desired that both signals 28 and 34 have as abrupt a leading edge as possible.

The main triger signal 28 may be fed via switch 35 to logic gate A for normal sweep actuation without using the time measurement system of the present invention. Gate A will have an operative output 36 only when both of its operative inputs are simultaneously present. These operative inputs include, in addition to the main trigger signal 28, an additional signal 38, which is constituted by the end-of-sequence signal derived from the sweep unblanking detector (end-of-sequence gate) 42. The gate 42 has three inputs, to wit, the end-of-sweep signal 8, the end-of-sweep-reset signal 18 and the complementary trigger signal 34. The gate 42 functions as follows: It will have an operative output 38 (an inhibiting signal) so long as either the inhibiting portion of end-of-sweep signal 8 or the inhibiting portion of end-of-sweep reset signal 18 are present. It will have no operative output 38 (it will no longer inhibit) only after the complementary triger signal 34 is received by the gate 42 at a time when the inhibiting voltages 8 and 18 are both absent.

Logic gate A has another input signal 40 which may be considered as an alternate input to the signal 28, and which is termed in the drawing "Delayed Trigger Signal." It constitutes the output from the time measuring system of the present invention which is shown in the lower half of the block diagram. This time measuring system must, if it is to function properly in the overall oscilloscope system, do two things. It must ensure that the frequency with which sweeps are initiated is properly related to the frequency of the recurrent phenomenon under investigation, and it must also ensure that the sweep is started each time at exactly the same point in the cycle of the phenomenon under investigation. Synchronization of the sweep frequency with the phenomenon frequency is accomplished by the synch pulse, and hence the synch pulse is used to start the time delay measurement. To ensure that each time delay is of the same duration as the next, to an extremely high degree of accuracy, the elements of the time measuring system cooperate with one another, and with the operation of the work device which they in turn control (in this instance the oscilloscope), in a fashion now to be described.

The system comprises a source of recurrent signals generally designated 44. Since, as will be seen, the measurement of time is accomplished by counting the recurrent signals emanating from the source 44, it is important to use for that source something which will produce signals at a highly accurate frequency. To that end a crystal oscillator may be used, and in particular one having an output frequency such as one megacycle per second. Such oscillators per se are known and are widely used precisely because of their accuracy. The source 44 may be termed a "clock" because it provides a series of signals which, when counted, accurately represent the passage of time.

The 1 megacycle per second output from the signal source or clock 44 is fed, as indicated by line 46, to a decade counter assembly generally designated 48 controlled by a manually actuated switch 50 so as to produce a selected one of three outputs 52, 54 and 56, those outputs corresponding in frequency to decade multiples of the basic output frequency from the clock 44. Thus the output 52 may represent the unchanged one megacycle per second output of the clock 44, the output 54 may be at a frequency of 100 kilocycles per second and the output 56 may be at a frequency of 10 kilocycles per second. The purpose of decade counter system 48, in conjunction with the clock 44, is to provide a variety of clock output frequencies from a single signal source, thereby to permit the measurement of time intervals over an expanded range. The use of additional decade counters or counters to a number base other than ten could be employed to increase the range and adaptability of the instrument.

The clock outputs 52, 54 and 56 are fed to a logic gate B the output 58 of which goes to the counting means generally designated 60. The counting means is designed to count the number of signals received thereby and then to produce an output signal 40, the counting means 60 being adjustable so as to cause the output signal 40 to be produced after any predetermined number of signals is counted. Many devices capable of accomplishing this result are known, and the precise nature of the device used forms no part of the present invention. One type of such counting device, here specifically illustrated, comprises a plurality of associated decade counters 64, 66 and 68 capable of counting up to 1000 individual signals, which functions in conjunction with a 999-position digital switch 70 manually adjustable, as indicated by the knob 72, to select any predetermined number of signals to be counted.

When the time measurement system is to be used, switch 35 is actuated to disconnect the main trigger signal 28 from logic gate A and connect the main trigger signal 28, now designated 74, to logic gate C. The output from logic gate C is fed, as indicated by line 76, to a count gate binary 78, the signal 76 serving to set the binary 78. The binary 78 operates in either of two conditions, termed "set" and "reset." The signal 76 "sets" the binary 78. A signal 80 "resets" it. When the binary 78 is set it has an output 82. When it is reset it has an output 84. The output 84 goes to logic gate B, and when it is present it inhibits or closes logic gate B, preventing the selected clock output 52, 54 or 56 from passing therethrough to the output 58 of gate B. When the inhibiting signal 84 is not present (when the binary 78 is "set"), the logic gate B is open, and the selected clock output 52, 54 or 56 does pass therethrough to the output 58.

When the logic gate C is open the main trigger signal 74 passes therethrough to the output 76. When the logic gate C is closed the input 74 does not pass therethrough. Logic gate C is open except when an inhibiting signal 85 is fed thereto.

The "set" output 82 of binary 78 is fed to the signal source or clock 44 and is effective to start the oscillations thereof. It therefore may be considered as a starting means for the clock 44. It is preferred that a delay vernier 86, manually adjustable as indicated by the knob 88, be interposed in the line 82 in advance of the signal source or clock 44.

As has been explained above, while a sweep sequence is taking place (and thereafter until a complementary trigger signal 34 is received thereby) an inhibiting signal 38 is produced by the end-of-sequence gate 42 (which may be considered as an actuating means for the time measuring system), which signal inhibits or closes the logic gate A. A similar signal is fed at the same time to the logic gate C to inhibit the latter, this being the inhibiting signal 85 previously described. When the sweep is over and the sweep resetting portion of the sweep sequence is underway, the sweep stop 10 has an output 90 which performs two functions. It goes to the signal source or clock 44 and stops the oscillations thereof, and it also goes to preset read-in gate 92 to "set" the latter, that is to say, to condition it, when subsequently "reset," to again cause the system 60 to count the predetermined number of signals. The preset read-in gate 92 has no operative output when it is "set." It is "reset" by a signal 80 produced by the sweep blanking circuit 14, this being the same signal 80 which serves to reset the count gate binary 78, and when "reset" the gate 92 has an output 93 which actuates the digital switch 70.

The operation of the disclosed system when the time measurement system is to be employed, is as follows: When the first operative synch pulse 20 is received it produces the main trigger signal 74 which passes through switch 35 to logic gate C. Since no sweep is taking place the trigger inhibiting signal 85 is not present. The main trigger signal 74 therefore passes through logic gate C. Output 76 from logic gate C sets count gate binary 78, removing the inhibiting signal 84 from logic gate B and producing signal 82 which, after an appropriate short delay in accordance with the setting of the delay vernier 86, starts the clock 44. The selected clock output signal 52, 54 or 56 passes through logic gate B (since inhibiting signal 84 is not present), the counting means 60 counts those signals, and after a predetermined number of such signals have been counted, in accordance with the setting of the digital switch 70, the delayed trigger signal 40 is appropriately formed. Since no trigger inhibiting signal 38 is present (no sweep sequence is occurring) logic gate A is open and the output 36 from logic gate A starts the sweep generator 2. Thus the sweep is initiated by the first operative synch pulse, but at a time after receipt of that first synch pulse by the logic gate A which is determined by the setting of delay vernier 86 and the counting means 60.

As soon as the sweep starts the inhibiting signals 38 and 85 are produced, inhibiting or closing logic gates A and C. Consequently subsequent trigger signals 74 are prevented from passing through logic gate C. (In the oscilloscope per se logic gate A is also closed, by signal 38.) After the sweep has been completed and sweep resetting is taking place, the signal 90 sets the read-in gate 92 and stops the signal source or clock 44. The sweep blanking circuit 14, through its output 80, then resets the read-in gate 92, actuating digital switch 70, and also resets the count gate binary 78, thus removing the signal 82 and producing the signal 84 which inhibits or closes logic gate B.

After the entire sweep sequence, including sweep blanking and resetting, has been completed, and thereafter a complementary trigger signal 34 is received by it, the end-of-sequence gate 42 removes its inhibiting signal 38 from the logic gate A, thus conditioning it to be actuated by the next received delayed trigger signal 40, and it also removes the inhibiting signal 85 from logic gate C, thus conditioning it to start counting (time measurement) when the next main trigger signal 74 is received.

When the oscilloscope is to be used in normal fashion without employing the time measurement system of the present invention, the switch 35 is actuated to connect the main trigger signal 28 directly to logic gate A, the system then functioning substantially in the manner described in the aforementioned patent application Ser. No. 433,083. Since the logic gate C is now disconnected from the main trigger signal 28, the time measurement system is rendered inoperative.

The fact that the signal source or clock 44 is stopped after each counting sequence has been completed, and is then restarted precisely at the beginning of the time interval to be measured, ensures a very high degree of accuracy insofar as reproducibility of the measurement of successive time intervals is concerned, eliminating the possibility of error in the starting of the actual time measurement at different points in the cycle of the output of the clock 44. While the clock 44 does not come up to speed instantaneously, it will, particularly when subjected to uniform ambient conditions, always come up to speed in almost precisely the same fashion, thus producing the desired accuracy. Whatever absolute counting error may be inherent in bringing the clock 44 up to speed can readily be compensated for by appropriate calibration, and/or by adjustment of the delay vernier 86. The delay vernier 86 is also effective to permit small variations in time delay under manual control, thereby giving the operator of the oscilloscope the ability to examine different portions of the phenomenon under investigation by means of a simple manual adjustment, and permitting time adjustment for periods of time less than that of a single cycle of the clock 44.

Although the time measuring system of the present invention has been specially designed for operation with an oscilloscope system utilizing the complementary trigger 32, it will be understood that it may be used with other oscilloscope systems and, indeed, with other work devices or by itself, simply as a time measuring system. Furthermore, the term "signal," as used herein, may mean either the presence or the absence of a predetermined voltage, current or the like, depending upon specific circuit design. It will also be apparent that many variations may be made in the specific arrangements of parts, in the types of elements employed, and the like, all without departing from the spirit of the invention as defined in the following claims.

I claim:

1. A time measuring system comprising a normally inactive source of recurrent signals to be counted, starting means operatively connected to said source and effective, when actuated, to render said source active, normally closed gate means, counting means connected to said source via said gate means and effective to count said recurrent signals, and actuating means for said system operatively connected to said starting means and to said gate means and effective to actuate said starting means, thereby to render said source active and to open said gate means, thereby to operatively connect said source and said counting means.

2. The system of claim 1, in which said source comprises a crystal oscillator.

3. In the system of claim 1, an adjustable time delay between said starting means and said source.

4. In combination, a time measuring system and a work device adapted to be started in operation on receipt of a first signal from said time measuring system and having an output producing an output signal indicating whether said work device is in operation or not, said time measuring system comprising a normally inactive source of recurrent signals to be counted, means for connecting a starting signal to said source and effective, upon receipt of said starting signal, to render said source active, counting means operatively connected to said source and operatively connected to said work device, said counting means being effective to count said recurrent signals and when a predetermined number of said signals is counted to send said first signal to said work device to start the latter, and means operatively connecting said output of said work device to said source and effective, when said work device is in operation, to render said source inactive.

5. The time measuring system of claim 4, in which said starting signal connecting means includes an adjustable time delay in advance of said source.

6. In combination, a time measuring system and a work device adapted to be started in operation on receipt of a first signal from said time measuring system and having an output producing an output signal indicating whether said work device is in operation or not, said time measuring system comprising a normally inactive source of recurrent signals to be counted, gate means, means for connecting a starting signal to said source and to said gate means and effctive, upon receipt of said starting signal, to render said source active and to open said gate means, counting means operatively connected to said source via said gate means and operatively connected to said work device, said counting means being effective to count said recurrent signals and when a predetermined number of such signals is counted to send said first signal to said work device to start the latter, and means operatively connecting said output of said work device to said source and to said gate means and effective, when said work device is in operation, to render said source inactive and to close said gate means.

7. The time measuring system of claim 6, in which said starting signal connecting means includes an adjustable time delay in advance of said source.

8. A time measuring system comprising an oscillator, counting means operatively conected to said oscillator effective to count the oscillations thereof, said counting means having an output which produces an output signal after a predetermined number of oscillations have been counted, connecting means for connecting a starting signal to said oscillator to sart the latter, and means connecting said counting means output to said oscillator and effective to stop said oscillator in response to said output signal, said means connecting said counting means output to said oscillator including a work device adapted to be started in operation by said output signal from said counting means, a gate operatively interposed between said oscillator and said counting means, first means operatively connecting between said work device and said gate and effective to close said gate when said work device is in operation, and second means operatively connected between said work device and said oscillator and effective to stop the latter after said work device is in operation.

9. In the system of claim 8, an adjustable time delay in said connecting means in advance of said oscillator.

10. A time measuring system comprising an oscillator, counting means operatively connected to said oscillator effective to count the oscillations thereof, said counting means having an output which produces an output signal after a predetermined number of oscillations have been counted, connecting means for connecting a starting signal to said oscillator to start the latter, and means connecting said counting means output to said oscillator and effective to stop said oscillator in response to said output signal, said means connecting said counting means output to said oscillator including a work device adapted to be started in operation by said output signal from said counting means, a gate operatively interposed between said oscillator and said counting means, first means operatively connected between said work device and said gate and effective to hold said gate closed when said work device is in operation, additional means operatively connected between said connecting means and said gate and effective to open said gate when said starting signal appears, and second means operatively connected between said work device and said oscillator and effective to stop the latter after said work device is in operation, said first means overriding said additional means, whereby said starting signal is ineffective while said work device is in operation.

11. In the system of claim 10, an adjustable time delay in said connecting means in advance of said oscillator.

12. In combination with an oscilloscope having a sweep system comprising means for producing a sweep sequence; a time delay sweep initiating system comprising a clock means having a recurrent signal output, counting means for counting said recurrent signals, a first gate means connecting said clock means and said counting means, said counting means having an output operatively connected to said sweep sequence producing means for actuating the latter, starting signal input means for producing a starting signal input, a second gate means operatively connected to said input means, control means for said second gate means operatively connected to said sweep producing means and effective to hold said second gate means closed while said sweep sequence is in progress, control means for said first gate means operatively connected to said second gate means and to said sweep producing means and effective to close said first gate means when said sweep sequence is in progress and to open said first gate means when said starting signal input passes through said second gate means, said second gate means connecting said input means and said clock means and being effective when open to cause said clock means to be started by said input signal, and means operatively connecting said sweep sequence means and said clock means for stopping said clock means after said sweep sequence has been started, said system preventing said clock means from starting until said sweep sequence has been completed.

13. In the system of claim 12, an adjustable time delay between said second gate means and said clock means.

References Cited

UNITED STATES PATENTS

| | | | |
|---|---|---|---|
| 2,422,698 | 6/1947 | Miller | 328—129 XR |
| 2,493,627 | 1/1950 | Grosdoff | 328—129 XR |
| 3,218,553 | 11/1965 | Peterson et al. | 328—129 XR |

STANLEY D. MILLER, Primary Examiner

J. ZAZWORSKY, Assistant Examiner

U.S. Cl. X.R.

328—63, 129